Sept. 21, 1937.　　　　A. S. BEMIS　　　　2,093,799
BEARING
Filed Aug. 8, 1934
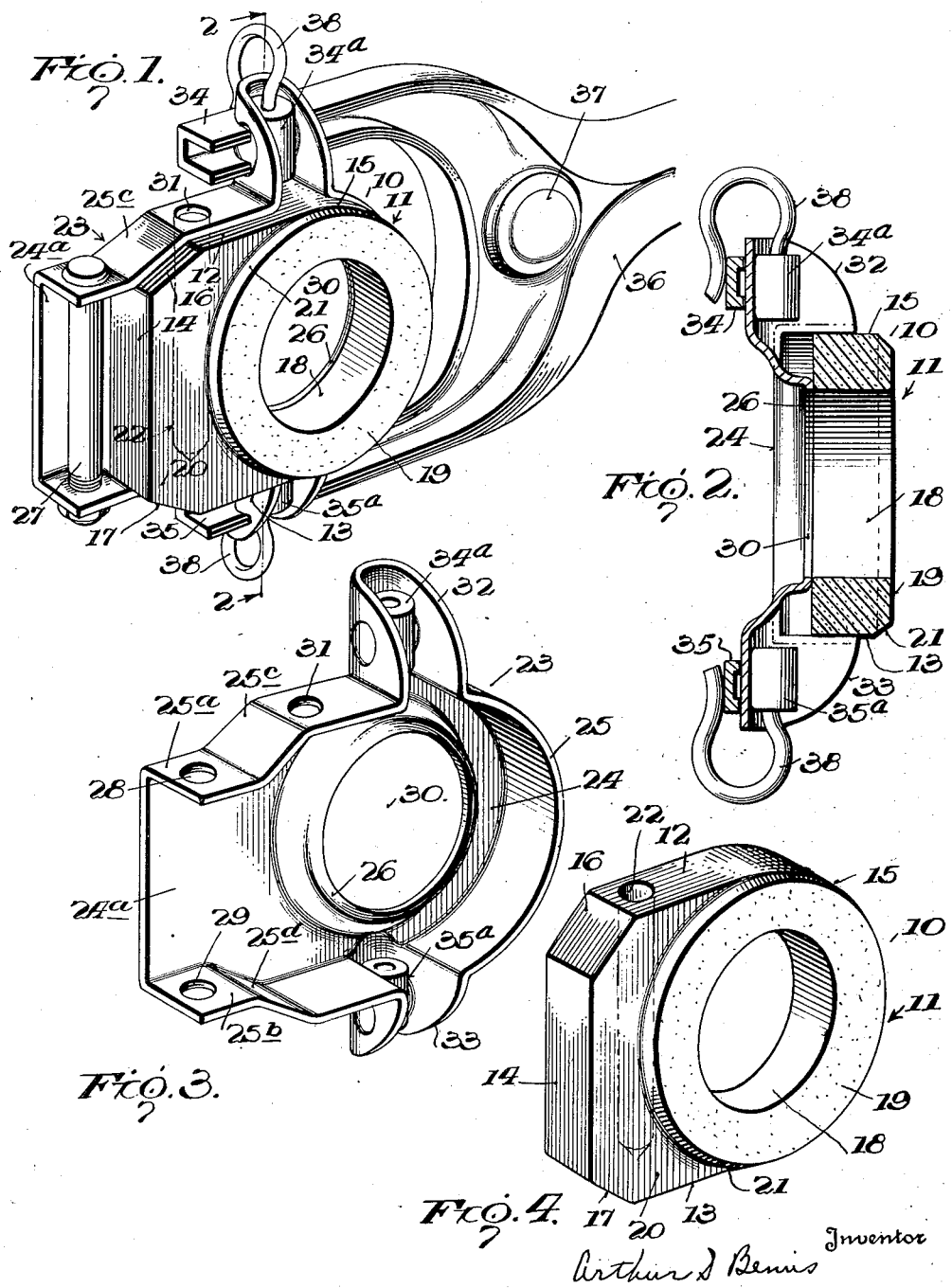

Patented Sept. 21, 1937

2,093,799

UNITED STATES PATENT OFFICE

2,093,799

BEARING

Arthur S. Bemis, St. Marys, Pa., assignor to Speer Carbon Company, St. Marys, Pa., a corporation of Pennsylvania Application August 8, 1934, Serial No. 739,022

4 Claims. (Cl. 308—168)

This invention relates generally to bearings; and it relates more particularly to bearings formed from porous material such as carbon, graphite or carbon composition, in which lubricant is intended to seep or exude from the interior of the bearing body or block at the active bearing surface. Bearings embodying this invention are particularly suitable for use as clutch throw-out bearings for automobile clutches, but it is to be understood that the invention is of general application and is not limited to bearings of this particular type.

It has been found difficult heretofore to properly lubricate bearings of the type described. It has been proposed to supply lubricant to the bearing, through which it seeped or percolated to the bearing surface, by providing a lubricant-receiving groove between the bearing and the metal collar or holder which secured or held the bearing, but this has not been satisfactory because it has been difficult if not impossible to obtain an oil-tight joint between the holder and the bearing. The carbon rings or bearings have to be made so hard to stand the wear imposed on them that they have no "give" to compensate for any unavoidable irregularities in the surfaces of the joint between the holder and the bearing, with the result that such assemblies leak oil.

One of the principal objects of the present invention is to overcome the objections noted in connection with the prior art and to provide a bearing of the type described which can be lubricated efficiently and easily without substantial loss or leakage of lubricant.

Another object of the invention is to provide a simple, unitary bearing which contains its own supply of lubricant in sufficient quantity to render it self-lubricating for long periods of time, independently of any outside source of lubricant supply.

Another object of the invention is to provide a combination of bearing and holder, both of which are of simple and inexpensive construction and which can be readily assembled and disassembled.

Briefly, these objects are accomplished according to this invention by providing a bearing formed from a mass or body of porous material capable of permitting lubricant to seep or flow through the pores thereof to the active bearing surface, the body or mass of porous material forming the bearing having entirely within itself and integral therewith a space or cavity acting as a reservoir for lubricant, the bearing and its self-contained reservoir comprising one compact unitary body or block complete in itself.

Other objects and novel features and advantages of the invention will become apparent from the following description taken in conjunction with the accompanying drawing which illustrates one practical form of bearing embodying the invention, it being understood that the description of this specific embodiment is merely illustrative and not restrictive.

In the drawing:

Fig. 1 is a perspective view of a bearing embodying this invention, the bearing being shown mounted ready for use as a throw-out bearing of an automobile clutch, Fig. 2 is a sectional view taken on the line 2—2 of Fig. 1, Fig. 3 is a perspective view showing the holder for the bearing, and Fig. 4 is a view similar to Fig. 3 of the bearing by itself.

For convenience, the invention will be illustrated and described as embodied in a release or throw-out bearing of an automobile clutch; but, as previously pointed out, the invention is of general application and is not limited to bearings of this particular type.

Referring to the drawing, 10 indicates generally one practical form of the novel bearing embodying this invention. In this form, which is designed for use as a thrust or throw-out bearing for an automobile clutch, it comprises a body or block 11 of porous material, such as carbon, graphite (electro-graphite) or carbon composition, having capillary pores permitting seepage or gradual flow of lubricant therethrough. In the example illustrated, block or plate 11 has two parallel side walls 12 and 13, an end wall 14 perpendicular thereto and a semi-circular end wall 15. For reasons which will be explained hereinafter, the corners at the junction of the side walls 12 and 13 and end wall 14 are most desirably cut off or beveled at 16 and 17, respectively. Adjacent to but spaced from the semi-circular end wall 15, the plate or body 11 is provided with a circular opening or hole 18 for the clutch shaft, and surrounding said opening is a flat annular active bearing surface 19 which is concentric with the circular opening 18 and the semi-circular end wall 15. Bearing surface 19 is elevated or raised above the flat front face 20 of block 11 and may be provided with a beveled peripheral edge 21. Thus it will be seen that the bearing comprises, in effect, an annular bearing surface or portion provided with a laterally projecting portion or extension.

Except for this lateral projection or extension, the bearing thus far described does not differ materially from the prior art bearings of this type which, as previously explained, are difficult to lubricate satisfactorily. This problem has been overcome according to this invention by providing the bearing with a self-contained chamber or cavity 22 integral therewith acting as a reservoir for lubricant, such as oil or grease, which can flow through the pores to the bearing surface and exude therefrom. The exact shape and location of the cavity or reservoir 22 can differ widely within the scope of the invention, but in the example illustrated it comprises a longitudinally extending bore or hole which extends into the body or block 11 from wall 12 and into the lateral extension or portion between hole 18 and end wall 14, provided therefor, the bore 22 and end wall 14 being desirably substantially parallel. As will be noted from the drawing, the cavity or reservoir 22 extends in close proximity to the bearing surface 19 so that when the said cavity is packed or filled with lubricant, such as heavy oil called "bright stock" by the oil trade, for example, said oil can flow through the capillary pores of the bearing to the bearing surface. As the lubricant reservoir is formed entirely within and integral with the bearing, the bearing and its self-contained reservoir comprising one compact unitary body or block complete in itself, there is no possibility of leakage of lubricant from the reservoir. Furthermore, because the bearing together with its reservoir is a unit complete in itself, it can be readily assembled and disassembled with a suitable holder, which can be very simple in construction because it is only necessary for the holder to keep the bearing in alinement and from turning.

A suitable holder for the bearing is indicated generally by 23 and in the example illustrated comprises a body 24 made of pressed metal having a peripheral flange or edge 25 conforming, in general, to the periphery of the bearing block 11, with the exception that the holder and flange extend laterally beyond the end wall 14 of the block as indicated at 24ᵃ, 25ᵃ, 25ᵇ, and that, for reasons which will be explained hereinafter, there is no flange for said end wall.

The bearing block is formed and arranged to fit within the flange 25, the bottom of said block resting upon a boss or seat 26 pressed up from the bottom of the holder so that about one-half of the bearing block projects out of or beyond the holder. The bearing block is held or clamped in place in the holder by means of a clamping bolt or similar fastening means 27 which extends through openings 28 and 29 in the lateral extensions 25ᵃ and 25ᵇ, respectively, of flange 25, the angular portions 25ᶜ and 25ᵈ thereof engaging the beveled portions 16 and 17, respectively, of the bearing block 11 to firmly and securely clamp or hold said block.

The holder is provided with a circular opening 30 which registers with the opening 18 in the bearing for the clutch shaft; and the flange 25 is provided with an opening 31 which registers with the upper end of the bore or cavity 22 to permit lubricant to be supplied thereto.

In order to support the collar or holder 23 and the bearing held thereby, the holder is provided with two integral laterally-extending trunnion ears or lugs 32 and 33 which extend diametrically of the hole or opening 30 and perpendicularly to the straight portions of the flange 25. These lugs or ears are formed with semi-circular portions which fit in similarly shaped ends 34 and 35 of a forked clutch release lever 36 pivoted at 37, the ears 32 and 33 being provided with cylinders 34ᵃ and 35ᵃ provided with holes to receive spring clips 38 to fasten the holder to the clutch fork. As shown in the drawing, when so mounted the extension 24ᵃ of the holder and the clamping bolt 27 are arranged outside the forked end of lever 36.

The above described bearing embodying this invention is particularly adapted for use with any suitable or conventional clutch in which a release or throw-out bearing engages or presses against a clutch release sleeve to release the clutch. When used in such a clutch, actuation of clutch release lever 36 about its ball joint or pivot 37 causes the bearing block 11 to press against the end of the clutch release sleeve and axially move it along the clutch shaft, axial movement of said sleeve operating the levers which in turn move the driven and driving clutch members out of clutching engagement, whereby the clutch is released.

It will be seen from the foregoing that not only has a very simple, compact, unitary bearing been provided which will automatically lubricate itself without leakage or loss of lubricant from the reservoir, but that such a bearing can be easily assembled and disassembled with a holder of very simple construction.

It is to be understood that the invention is not limited to the exact arrangements shown and described and that various changes in the bearing and the holder can be made without departing from the spirit and scope of the broad invention as defined in the claims.

What is claimed is:

1. A bearing comprising a body of porous material provided with a cavity extending into said body from one wall thereof providing a complete lubricant reservoir, all the walls of which are within the interior of said body and spaced from the bearing surface whereby lubricant is supplied to said bearing surface through the porous material only.

2. A thrust bearing of porous carbon material for use in automobile clutches provided with an annular bearing surface and having a lateral extension provided with a cavity extending thereinto from one wall thereof providing a reservoir complete within said bearing, said cavity being arranged adjacent to but spaced from said bearing surface for supplying lubricant to said bearing surface through the pores only.

3. The combination, with a thrust bearing of porous carbon material for use in automobile clutches having complete within itself a cavity acting as a reservoir for lubricant which can flow to the bearing surface through the pores, of a holder provided with a peripheral flange for receiving and holding said bearing, said flange being provided with an opening registering with said cavity to permit lubricant to be supplied thereto.

4. The combination, with a bearing comprising a body of porous material provided with an annular bearing surface and having a lateral extension in which is provided a cavity extending thereinto from one wall thereof providing a reservoir complete within said body for supplying lubricant to said bearing surface through the pores, of a metal holder provided with a peripheral flange for receiving and clamping said bearing, said flange conforming generally to the periphery of said bearing, and means for flexing a portion of said flange to cause it to clamp said bearing.

ARTHUR S. BEMIS.